Figure 1:
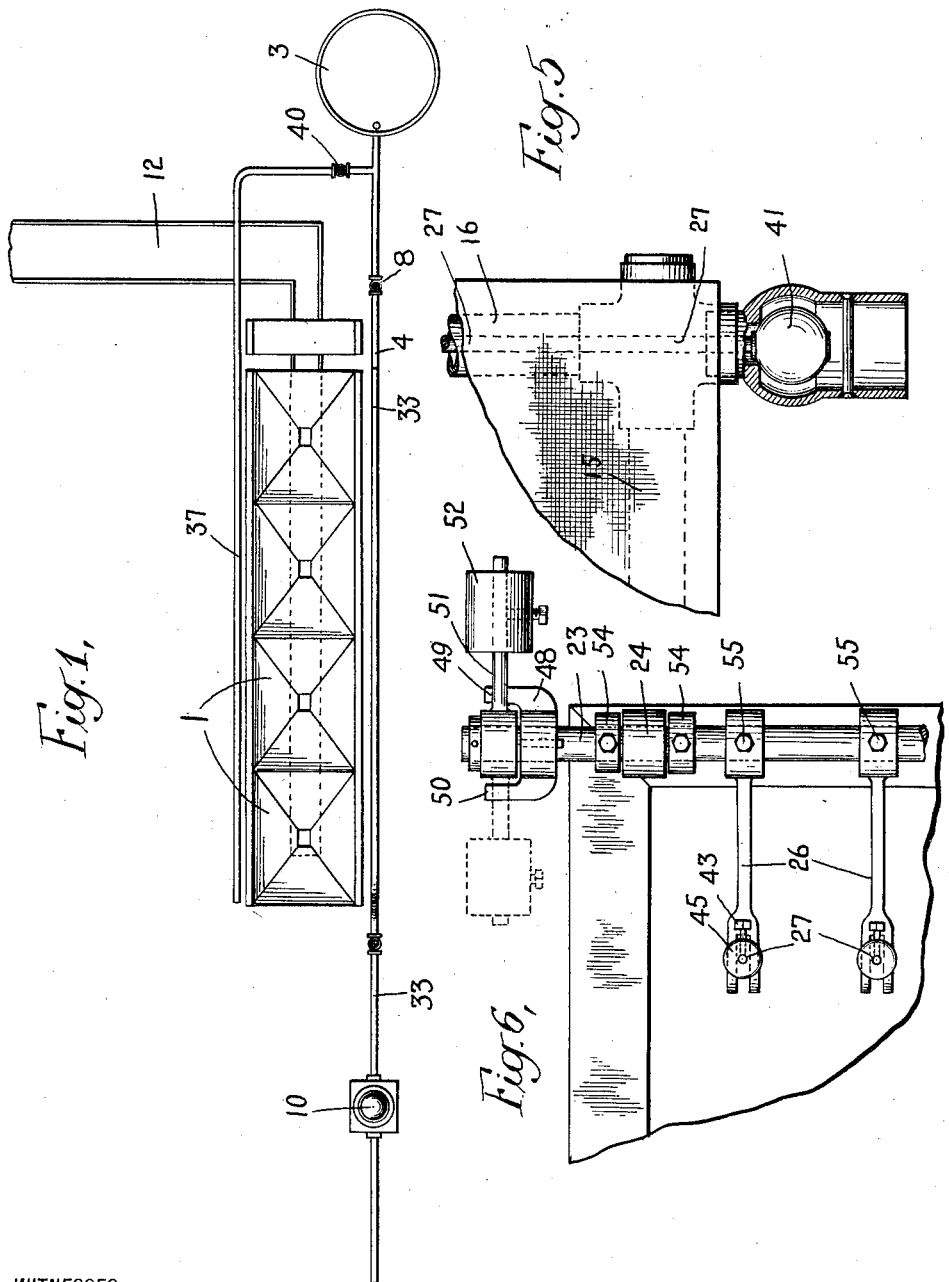

C. BUTTERS.
APPARATUS FOR USE IN FILTERING SLIMES.
APPLICATION FILED JUNE 14, 1913.

1,100,220.

Patented June 16, 1914.

3 SHEETS—SHEET 1.

WITNESSES:
Newton A. Burgess
George Schlatt

INVENTOR,
Charles Butters,
BY
Kenyon & Kenyon
his ATTORNEYS

C. BUTTERS.
APPARATUS FOR USE IN FILTERING SLIMES.
APPLICATION FILED JUNE 14, 1913.

1,100,220.

Patented June 16, 1914.
3 SHEETS—SHEET 2.

WITNESSES:
Newton A. Burgess
George Schlett

INVENTOR,
Charles Butters,
BY
Kenyon & Kenyon
his ATTORNEYS.

C. BUTTERS.
APPARATUS FOR USE IN FILTERING SLIMES.
APPLICATION FILED JUNE 14, 1913.
1,100,220.
Patented June 16, 1914.
3 SHEETS—SHEET 3.
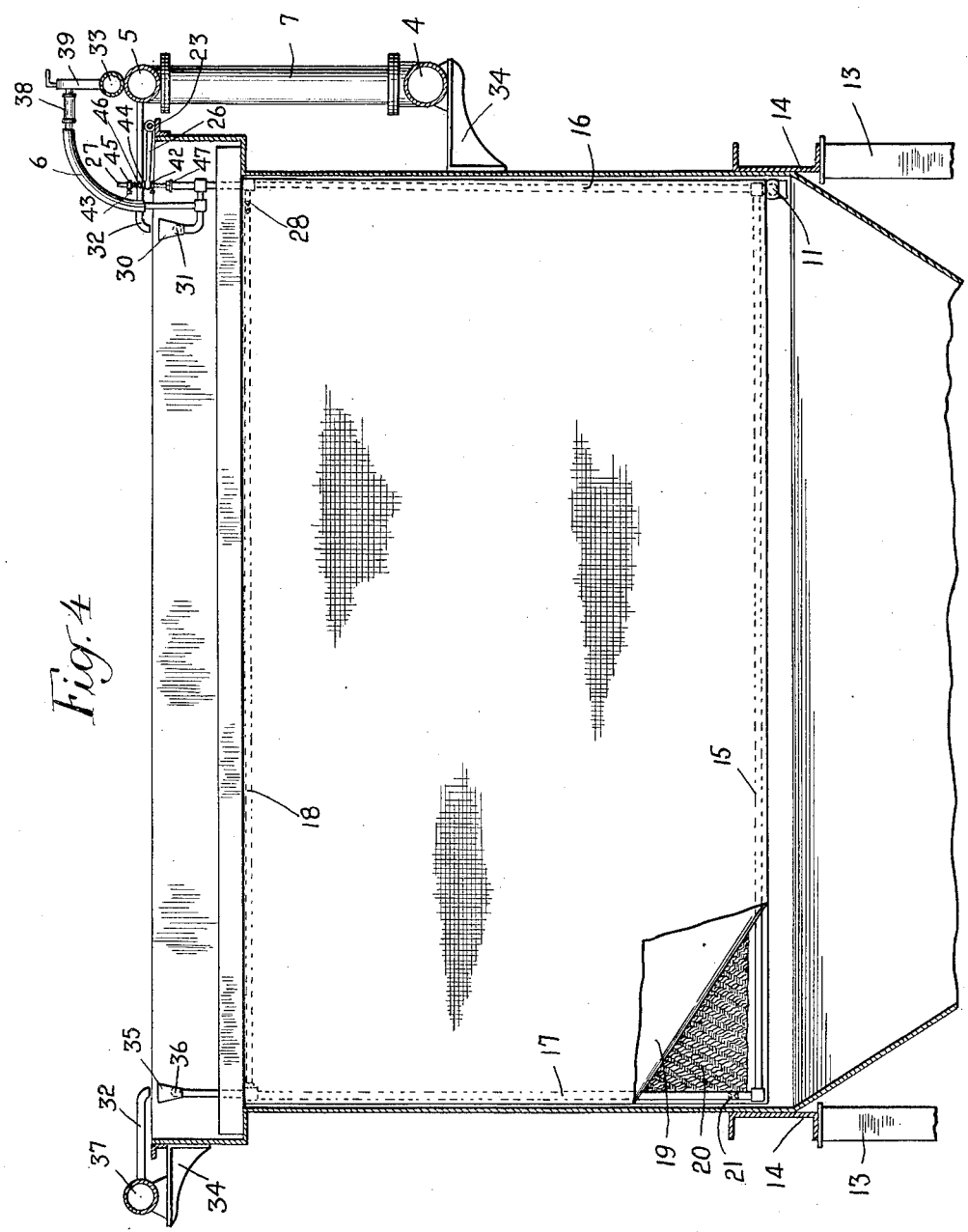

UNITED STATES PATENT OFFICE.

CHARLES BUTTERS, OF OAKLAND, CALIFORNIA.

APPARATUS FOR USE IN FILTERING SLIMES.

1,100,220.            Specification of Letters Patent.     Patented June 16, 1914.

Application filed June 14, 1912. Serial No. 773,601.

*To all whom it may concern:*

Be it known that I, CHARLES BUTTERS, a citizen of the United States, and a resident of Oakland, county of Alameda, State of California, have invented new and useful Improvements in Apparatus for Use in Filtering Slimes, of which the following is a specification.

The object of my invention is to shorten the time taken for a cycle of operation in the process of filtering valuable compounds, such as slimes, which result from the well known cyanid process of treating ores.

In abstracting the values from slimes one of the most difficult and troublesome problems is to dislodge reliably and within an economical time, the slime cake from the surface of the filter medium after the filter process has been completed, without injuring the filter surface of the leaf.

It has been the practice heretofore to dislodge slime cakes by air pressure placed on the interior of the leaves while suspended in the air, or this has been accomplished in some cases by water under pressure being passed through the filter medium in a direction reverse to that of the filtrate. It has been supposed heretofore that to dislodge the cake reliably and within an economical time, pressure was necessary whether air, water or other fluid was used in the dislodging step, and special precaution has sometimes been taken to get a uniformly thick, cohesive and resistant cake deposit such that the fluid under pressure might dislodge it as an entirety and render unnecessary any additional means to dislodge the cake completely. By my process such uniformity of the cake is of no importance at all to the cake dislodgment, and consequently the filtering operation may be more economical.

If notable internal pressure is put on a leaf for cake-dislodgment purposes, a heavy filter medium is necessary and means must be provided to prevent distention or ballooning of the filter medium. Various means have been devised to this end, all of which have added to the cost of the leaves and to the difficulty of cake-dislodgment. As a matter of practice, too, it is found that all such means are a hindrance to proper and economical operation; further, they shorten the life of the leaves, but they have been regarded as indispensable when former practicable methods of cake-dislodgment have been used.

The efficiency of the leaves heretofore used is low, first, because a considerable amount of the filter surface of the medium is obstructed by the means used to prevent ballooning, such as strips down the sides; and second, because of stitching the media together or by bolting strips onto the outside of the leaf to prevent ballooning, comparatively large holes are made in the media. Also, these holes make the media more liable to rupture under internal pressure, thus shortening their life.

I have discovered that pressure is unnecessary to reliable cake-dislodgment within an economical time, and that complete success can be attained by saturation of the entire area of the filter medium. It is found in practice that these cakes have unusual adhesion and cohesion, and that when a cake is formed on each side of a filter leaf they are not easily dislodged. Due to the great cohesion of the cake it is important that the upper part, as well as the other parts, of the filter medium be saturated in the dislodging step.

The cake to be dislodged from a filter medium adheres more closely to the surface of the filter medium if there is any excess of external over internal pressure. It is, therefore, desirable to have the internal and external pressures equalized during the dislodging step, and I have devised means to that end, which equalize such pressures when desired, by opening communication between the external and the internal water.

It is possible in my type of leaf to completely saturate the entire filter surfaces during the dislodging step. Also, if the cake is dislodged without internal pressure, a lighter filter cloth may be employed and all means heretofore required to prevent ballooning dispensed with. In such case the filter surfaces may be smooth being clear of all manner of bracing, stitching or other surface-roughening means which have heretofore been necessary to prevent ballooning when other practicable methods of cake-dislodgment have been used, and consequently the cake is more easily dislodged.

The invention outlined above is an improved form of the invention described and broadly claimed in an application filed by me on the 11th day of June, 1913, and being Serial No. 772,946. The present improvement provides means for the manual opening and closing of the equalizing valves connected to the submerged portion of the leaf shown in that application.

Figure 2:
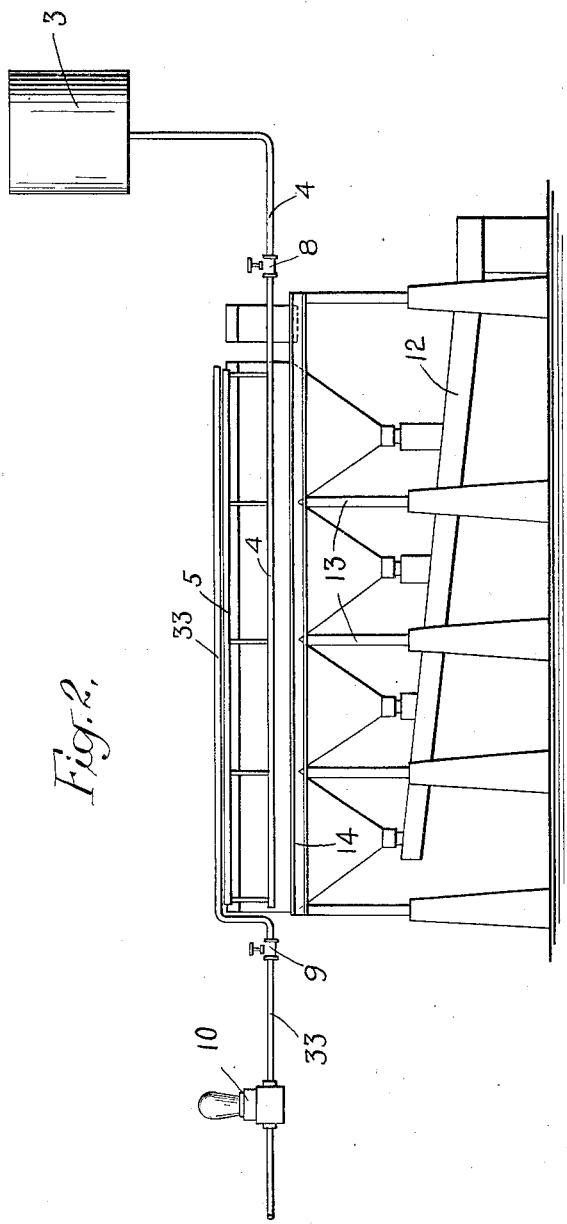
Figure 3:
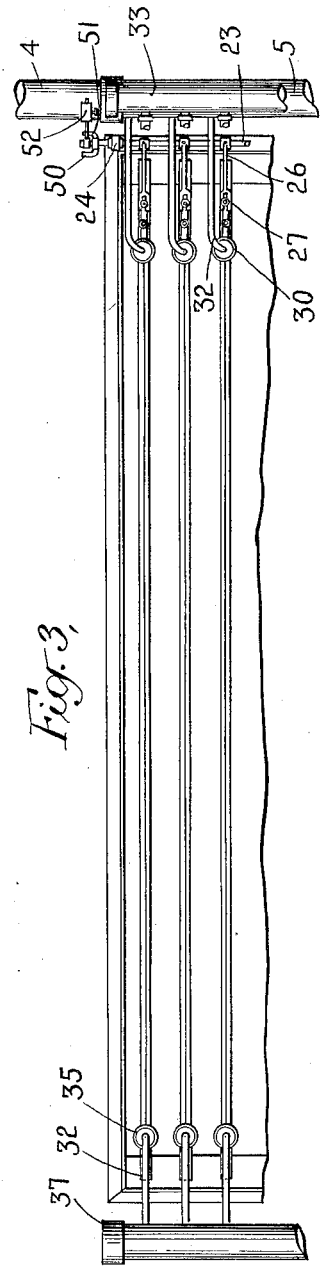

In the accompanying drawings Figure 1 shows a diagrammatic plan view of a general layout showing a clean water source and piping for supplying the water to the leaves; Fig. 2 is a side elevation of the devices shown in Fig. 1; Fig. 3 is a plan of a portion of a vat with several leaves therein; Fig. 4 is a view of a leaf embodying my invention; and Figs. 5 and 6 show detail views of an equalizing valve and its operating means.

In Fig. 1 are shown a plurality of vats 1 in which the leaves 2 are placed as shown in Fig. 3. These leaves are connected with the clean water source 3 by means of piping 4, risers 7, pipe 5, pipes 32, and funnel 30 on one side, and by means of the pipe 37, pipes 32 and funnels 35 on the other side. In each case the pipes 32 may discharge into funnels, or other suitable means for conducting water into the leaves. In order that the water may reach all the leaves quickly the pipe 5 is arranged along the top of the vats and is connected with the pipe 4 from the water supply 3 by means of risers 7. The interior of the leaves is connected with the vacuum-pump 10 through end members 16, members 6, sight-glasses 38, valve members 39 and pipe 33. The pipes 4, 5 and 33 are suitably supported by any means, such as members 34 fastened to the side of the vat. The pipe 37 may be supported by similar means. In pipe 4 is placed valve 8 so that the water may be admitted to, or cut off from, the leaves. In the pipe 37 is the valve 40 by which the admission of water into the pipe 37, and therethrough into the leaves through funnels 35, may be controlled as hereinafter explained. The pump 10 is shown connected with the pipe 33 for the purpose of creating a vacuum within the leaves when desired.

When it is desired to begin the filtering operation the valves 8 and 40 are closed, the valve 9 is opened and the pump 10 started to decrease the pressure within the filter leaves, and thereby draw a filtrate through and form cakes on the surface of the filter media 19. When cakes of sufficient thickness have been formed, they may be treated in well known ways with barren solution and then with wash water, and they are then ready to be dislodged. The valve 9 may then be closed and the valve 8 opened, thereby permitting water to run into the leaves from the tank 3 through the piping 4, risers 7, pipe 5, pipes 32, and funnels 30, thus dispelling the air through the valves 35, filling the leaves, saturating the filter media and thereby causing the cakes to drop within four or five minutes. The valve members 31 will have been removed from the funnels to allow the entrance of water into the leaves, or they may be made of light material such as wood so that they will float when the funnels are filled with water and thereby automatically allow water to pass through. They will automatically seat when the water is out and vacuum is created within the leaf. The thick slime is then run out from the bottom of the vats into the run-way 12, and thence to the slime-pit. The vats may be properly supported by any convenient means such as the pillars 13 and I-beams 14, as shown in Fig. 4.

As shown in Fig. 4, the leaf comprises a frame having members 15, 16, 17 and 18, preferably of tubing. Over this frame is secured a filter medium 19 of canvas or other suitable material. Inside the filter-leaf is a fibrous filler 20 preferably of cocoa-mat, for holding the sides thereof apart when vacuum is created within the leaf. This filler may be supported by any suitable means as, for instance, from the top frame member 18.

The lower frame member 15 is perforated or slotted along its upper side and is connected to a vacuum pump 10, or other pressure-decreasing means through the right-hand end member 16 and the connection 6, which may be of rubber, or other suitable material, sight-glass 38, valve member 39 and the pipe 33. The filtrate is removed by means of the pump 10. The left-hand frame member 17 is plugged by any suitable means such as a wooden plug as shown at 21 in Fig. 4. The top frame member 18 is perforated or slotted along its lower side and to this member is attached a suitable relief valve 35. This member is also plugged as shown at 28, and is connected to the right-hand end member to make a rigid frame structure. It is useful to be able to wash out the cocoa mat occasionally between filtering operations by admitting water from the tank 3 through valve 40, pipe 37, pipes 32 into the funnels 35, and for this purpose the relief valve may be provided with a funnel. At the time that the water is admitted the valve member, such as a ball 36, may be removed from the funnel unless it is light enough to float. It is not necessary that the relief valve be connected to the frame member, but this arrangement is preferred and it is so illustrated in the drawings. The pipe 22 connecting the valve to the leaf may be of any suitable length. The relief valve should be connected to the upper portion of the leaf in order to allow the escape of air.

As shown in Fig. 4 the leaf is provided with a funnel valve at each upper corner. While these valves may be similar in structure they have different functions. The function of the valve at the right-hand corner is to admit water without pressure into the leaf for the purpose of dislodging the cake as heretofore described. The functions of the funnel valve at the left-hand corner are to allow water to be run through the leaf for occasionally washing out the cocoa mat or other filler after the cake has been dislodged, and to permit air to escape while the leaf is being filled with water from the funnel at the opposite corner during the cake-dislodging step. The funnel valves at the right-hand corners of the leaves may be dispensed with and water for dislodging the cakes supplied through the members 6, if desired. There can be no internal pressure under these circumstances due to the presence of the relief valves at the top of the leaves and the valves 11 at the bottom thereof if opened as explained hereinafter.

The valves 11 are attached to the lower frame member of the leaf as shown in Fig. 4. The details of this valve are shown in Fig. 5. Means for operating the valves are shown in Figs. 3, 4, 5 and 6, and will now be described. A shafting 23 is mounted in suitable bearings 24 and extends across the side of the vat. Mounted on the shaft 23 are arms 26 which are adapted to move a rod 27 up or down. On the lower end of the rod 27 is mounted the valve member 41 of the valve 11. Mounted near the upper end of the rod 27 is an adjustable collar 42 having a set screw 43. A slidable collar 44 is also mounted upon the rod 27, which collar is on the opposite side of the arm 26 from the collar 42. Also mounted on the rod is a third collar 45 having a set screw by which its position may be changed and fixed. Between the collars 44 and 45 is a spring 46. This spring is adapted to act as a cushion as will be discussed more fully hereinafter. The valve member 41 is so mounted on the rod 27 that it does not have a longitudinal movement thereon in either direction. Arranged in the upper end of the end frame member 16 through which the rod 27 extends is a stuffing-box 47 for the valve rod 27 and which is so arranged that when vacuum is created within the leaf it will effectively prevent the entrance of air. The collar 42 may be so adjusted with relation to the upper portion of the stuffing-box 47 that the downward movement of the rod 27, and therefore the valve member 41, will be limited thereby. On the end of the shaft 23 is mounted a member 48 having projections 49 and 50. This member 48 is keyed to, or otherwise rigidly fastened on, the shaft 23 so that it does not move thereon. The projections 49 and 50 are arranged to be in the path of an arm 51 carrying a weight 52. This arm 51 is mounted on the shaft 23 so that it moves freely around said shaft. It is prevented from moving longitudinally of the shaft in one direction by the member 48 and in the other direction by a collar 53 or other suitable means. On either side of the bearing 24 is a collar 54 having a set screw and adapted, when in position, to prevent longitudinal movement of the shaft 23 with relation to the leaves. The arms 26 are mounted adjustably by means of the set screws 55 so that one arm comes opposite each leaf. The outer end of the arm is bifurcated and adapted to move the rod 27 up or down by engaging either the slidable collar 44 or the adjustable collar 42. The contacting surfaces of this arm are curved so as to get a line of contact approximately along the axis of the valve rod 27 as a result of which the rod will move freely.

The operation of the device above described is as follows:—When it is desired to open the valves 11 the weight 52 is moved by hand from the position, indicated in full lines in Fig. 6, counter-clockwise. After the weight has passed the vertical line it moves with considerable force downward and when it has moved a certain distance it strikes the projection 50 a considerable blow and moves the projection 50 with it. As the projection is rigidly attached to the shaft 23 this means that the shaft 23 will be rotated. As above described, the arms 26 are rigidly mounted on the shaft 23 and contact with the adjustable collar 42 on the valve rod 27 in each leaf and therefore the rotative movement imparted to the shaft 23 by the weight 52 will be communicated through the shaft 23 and the arms 26 to the adjustable collars 42 on the rods 27 of all the leaves and will thereby cause a downward movement of the valve rods. Since the valve members 41 are rigidly fixed to the valve rods they will also move downward and thereby open the valves 11. This position will be maintained as long as the weight is allowed to remain in the position shown in dotted lines in Fig. 6. When it is desired to close the valves 11, the weight 52 will be raised and turned clockwise and after it has passed the vertical line in this direction it will fall with considerable force and give a considerable blow to the projection 49 and will carry the projection around with it. As explained above this movement will be imparted to the arms 26 and therethrough to the valve members 41 which will be raised and the valves 11 closed. In order that the valve members 41 will not be injured springs 46 are provided between the collars 44 and 45. When the arms 26 move upward they will strike the slidable collars 44 and their force will be imparted by the springs 46 to the upper adjustable collars 45 and therethrough to the rods 27 comparatively gently, and the heavy blow, which would otherwise soon destroy the valve members 41, which are preferably rubber balls, is absorbed by the springs.

Another function of the springs 46 and adjustable collars 42 and 45 is that the upward pressure on the valve members, when seated, can be regulated. This regulation can be secured for each individual valve, although some of the valves on the various leaves may be lower or higher than some of the others, by changing the position of the collars 42 and 45, or by changing the angular position of the arms 26 on the shaft 23 and thereby any desired pressure can be put upon the valve members when seated. By providing the springs all the valves will be sure to close. The advantage of this arrangement is great for, as will be seen, it would be practically impossible to arrange all the valves so that they would close if the spring were omitted. This gives great flexibility to the arrangement and makes it possible to get good results without a too fine adjustment.

It will be noticed that the weight 52 is placed on the shaft 23 at one of its ends and beyond the ends of the pipes 5 and 33. This is convenient for the reason that the weight must make substantially a half revolution in the operation of opening and closing the valves 11. By this arrangement the weight which has to make a half revolution is placed so that it will not strike against the pipes or the vat. The arms 26 on the shaft have to move only through a distance equal to the movement of the valves 11 in opening and closing and this means that they can be placed along the vat and satisfactorily operated without interfering in any way with the various piping for supplying the water and taking away the filtrate.

The valves 11, whose operation has been described above, are provided to open free communication between the exterior and interior of the leaf to which they are attached whereby the hydrostatic pressures on the sides of the filter surfaces may be equalized. These valves may be connected to any submerged portion of the leaf but they are preferably connected as shown in the drawing.

The operation of the complete leaf as shown in Fig. 4 is as follows:—The valves 11 are closed. The leaf is then submerged in the slimes bath by allowing the bath to run into the vat, care being taken not to allow slimes to enter the funnel valves. After the leaves are submerged a few inches, suction is applied to the interior of the leaves by any means, such as a vacuum pump 10. The filtrate is carried off by this pressure-decreasing means. As soon as the vacuum is turned on the valves 30 and 35 will close and seal. Suction is continued until a cake of proper thickness is deposited on the filter surface. This cake may then be variously treated with barren solution and wash water, the valves 30 and 35 remaining sealed throughout these operations. In order to dislodge the cakes, the filter leaves being submerged in wash water, the vacuum is turned off, the balls 31 are removed from the funnels 30, unless they are light enough to float, and water is admitted through pipes 32 and funnels 30 into the bottom frame member 15. As the water rises in the leaf the air passes out through the relief valve 35 at the left-hand corner and thereby the water rises to the very top of the leaf and completely fills it and thereby saturates the entire surface of the filter media. At some point during this filling operation, the valves 11 will be opened and thereby establish communication between the external and internal water whereby the external and internal pressures will be equalized and the cakes will then be rapidly dislodged. The filter leaf may then be washed out internally by admitting water through the funnel valves 35 at the left-hand corner, and allowing it to discharge through the valve 11 at the lower corner.

Having described my invention, what I claim as new and desire to secure by Letters Patent, is:—

1. A suction filter leaf having a manually operated valve connected with a submerged portion thereof.

2. A suction filter leaf having a manually operated pressure equalizing valve connected with a normally submerged portion thereof.

3. The combination of a filter leaf, a valve connected with said leaf and adapted to be submerged, and means by which said valve may be positively operated while it is submerged.

4. In a suction filter leaf the combination of a valve connected to said leaf and adapted to be submerged and means for operating said valve so that it will seat resiliently.

5. In a suction filter leaf the combination of a valve connected to said leaf and adapted to be submerged and means for operating said valve so that it will seat resiliently and holding said valve seated.

6. The combination of a vat, a plurality of filter leaves mounted therein, valves connected to said leaves and adapted to be submerged, means for opening and closing all of said valves simultaneously while submerged and means for adjusting the pressure of said valves on their seats when they are seated.

7. The combination of a vat, a plurality of filter leaves mounted therein, valves connected to said leaves and adapted to be submerged, means for opening and closing said valves simultaneously and means whereby the pressure between each valve and its seat may be made the same.

8. The combination of a vat, a plurality of leaves mounted therein, one member of a valve on each leaf, a shaft, means for rotating said shaft, rods having valve members mounted on one end thereof, arms mounted on said shaft and adapted to coöperate with said rods whereby said valve members are operated.

9. The combination of a vat, a plurality of leaves mounted therein, one member of a valve on each leaf, a revoluble shaft, means for rotating said shaft in both directions, rods having valve members mounted on one end thereof, adjustable collars mounted on the other end of said rods, a slidable collar mounted between said adjustable collars, a spring between said slidable and one of said adjustable collars and arms adjustably mounted on said shaft and adapted to engage said slidable and the other adjustable collar whereby said valve members are operated when said shaft is rotated.

In testimony whereof, I have signed my name to this specification, in the presence of two subscribing witnesses.

CHARLES BUTTERS.

Witnesses:
NEWTON A. BURGESS,
EDWIN SEGER.

Copies of this patent may be obtained for five cents each, by addressing the "Commissioner of Patents, Washington, D. C."